Patented June 12, 1934

1,962,828

UNITED STATES PATENT OFFICE 1,962,828

PROCESS FOR THE MANUFACTURE OF CELLULOSE DERIVATIVES CONTAINING PHOSPHORUS

Carl J. Malm, Rochester, N. Y., and Charles E. Waring, Dayton, Ohio, assignors to Eastman Kodak Company, Rochester, N. Y., a corporation of New York No Drawing. Application August 5, 1930, Serial No. 473,285

4 Claims. (Cl. 260—101)

This invention relates to a process for preparing inorganic derivatives of cellulose and particularly for the preparation of such esters as cellulose phosphate and cellulose phospho-acetate.

There have been many processes described in the literature for the preparation of cellulose phosphates, none of which, however, appear to have had a particular commercial success. For instance, in British Patent 8,646 of 1910 to Merckens, et al, there is described a process for making cellulose phospho-acetate by treating cellulose with acetic anhydride in the presence of sulphuric acid and a phosphorus oxychloride. At the most there could be but a very small amount of phosphorus present in the resulting cellulose acetate as the phosphorus oxychloride used in this process is present in amounts only sufficient to act as a catalyst for the acetylation of the cellulose. British Patent 279,796 to I. G. Farbenindustrie A. G. of October 26, 1926, discloses a process for the preparation of cellulose phosphate in which soda cellulose is treated with phosphorus oxychloride and benzene for a period of about twelve hours. The product is stated to contain approximately 16% of PO4 which is equivalent to about 5% of phosphorus. This product is asserted to be soluble in water. As the starting material is a soda cellulose prepared from 40% sodium hydroxide, it would be expected that the cellulose would be greatly broken down due to the drastic pretreatment and likewise to the activity of the phosphorus oxychloride. It is not surprising, therefore, that the final product is degraded to such a degree that it is water soluble.

Processes have been published for the treatment of cellulose in concentrated phosphoric acid solutions under various conditions and the subsequent precipitation of the resulting product which has been in some instances called a cellulose phosphate. Cellulose which has been dissolved in phosphoric acid and reprecipitated from this solution, however, does not, if carefully washed, contain any combined phosphorus. This method of attack, therefore, has not proven successful for the preparation of cellulose esters containing phosphorus. We have, however, perfected a process whereby said esters of cellulose may be readily and consistently prepared.

An object, therefore, of the present invention is to provide a process whereby derivatives of cellulose may be prepared containing phosphorus. Another object of this invention is to provide a process for preparing derivatives of cellulose containing phosphorus, the products being substantially undegraded. A further object of this invention is to provide a process for the preparation of cellulose phospho-acetate. Other objects will hereinafter appear.

We have found that if cellulose or cellulosic derivatives are treated with a mixture containing phosphorus oxychloride and an organic base, a product may be obtained which contains as high as 10% of combined phosphorus. The cellulose so treated, if it be of the cotton linter or similar structure, will not lose its fibrous structure during the treatment. Cellulose phosphate prepared in this manner is insoluble in practically all organic solvents and also insoluble in cuprammonium solution. Moreover, this product resists burning to a very high degree and has the unusual ability to retain basic dyes such as fuchsin and malachite green which are generally quite inactive toward cellulose in its ordinary form.

Our process consists essentially in treating various types of cellulosic material, such as cotton linter, surgical cotton, cuprammonium silk, etc., or cellulose derivatives such as cellulose acetate, cellulose nitrate, etc., in an esterifying bath consisting of phosphorus oxychloride and an organic base such as pyridine. The reaction on cellulose requires in the neighborhood of from six days to one week, depending in a large extent upon the type of cellulosic raw material or cellulosic derivative being esterified and also upon the temperature of the reaction. We have found that at a temperature of 60 to 65 degrees centigrade a cellulose phosphate can be obtained having approximately 6% phosphorus in a period of approximately six days.

It is not material what types of organic base be employed for this esterification so long as they are solvents for the phosphorus oxychloride and are not solvents for the cellulose phosphate produced. We have found the following organic bases useful for our purpose; quinaldine, isoquinoline, pyrrole, and pyridine, but the latter is preferred.

We shall now give several examples for the preparation of cellulose containing phosphorus, but it will be understood that we will not be limited by the details therein given except as they may be restricted by the claims appended hereto.

*Example 1.*—10 grams of cotton linters may be heated in a suitable jacketed container with a mixture of 150 cc. of pyridine and 25 cc. of phosphorus oxychloride. After thoroughly mixing these ingredients the temperature is maintained at from 60 to 65 degrees centigrade for a period of six days. The final product is washed with water, and thoroughly dried. The finished cellulose phosphate will contain approximately 6% of combined phosphorus.

*Example 2.*—10 grams of surgical cotton, which has been mercerized with 18% sodium hydroxide, washed free of alkali and dehydrated with alcohol and ether and subsequently thoroughly dried at a low temperature, may be treated in the same type of apparatus as described above by suspension in a mixture of 150 cc. of pyridine, and 25 cc. of phosphorus oxychloride. The jacketed container is maintained at a temperature of 60 to 65 degrees centigrade and after six days the cellulosic material may be removed from the reaction mass, washed and dried as above. Upon analysis such a compound will be found to contain approximately 6% of phosphorus.

*Example 3.*—50 grams of cuprammonium silk may be suspended in 400 cc. of pyridine and 75 cc. of phosphorus oxychloride, and maintained at a temperature of 60 to 65 degrees centigrade for one week in a manner similar to that described above. The final product upon washing and drying will be found to contain upon analysis approximately 10% of combined phosphorus.

*Example 4.*—10 g. of cellulose acetate containing 38% acetyl is dissolved in 50 g. of pyridine. A solution of 10 g. of phosphorus oxychloride in 25 cc. of pyridine is added to this solution. The mixture is allowed to stand at 25–30° C. for 24 hours when a jell is formed. The jell is worked up with water and washed thoroughly with water and dried. The product, which is insoluble in most organic solvents, contains about 6% phosphorus.

The remarkable characteristic of our products, as prepared above is that they are insoluble in practically all organic solvents usually employed for the solution of cellulose derivatives. Moreover, they are all insoluble in water thus indicating that there has been slight, if any, degradation of the cellulose. The solubility of cellulose derivatives in water generally indicates that the cellulose molecule has been broken down during the esterification.

Owing to the exceptionally high resistance to burning shown by our new cellulose derivatives there are many uses in which they can be employed with great advantage as for instance, in high temperature valve or similar packing, filler in various compositions in which their textile like character aids in knitting the composition together, and numerous other uses.

While the above disclosure describes processes for the preparation of phosphates of cellulose it will be realized that any process for the preparation of such esters in which the esterification is conducted in a bath containing a pentavalent oxychloride of phosphorus and any organic base or their equivalents will come within the scope of this invention without sacrificing any of its advantages.

What we claim as our invention and desire to be secured by Letters Patent of the United States is:

1. A process for the preparation of a water insoluble organic derivative of cellulose containing phosphorus which comprises esterifying a partially hydrolyzed organic compound of cellulose in a bath containing phosphorus oxychloride and pyridine.

2. A process for the preparation of a water insoluble cellulose acetate containing phosphorus which comprises esterifying a hydrolyzed cellulose acetate in a bath containing phosphorus oxychloride and a tertiary organic base.

3. A process for the preparation of water insoluble derivatives of cellulose containing phosphorus which comprises esterifying 10 parts of cellulosic material in a bath containing approximately 150 part of pyridine and 15 parts of phosphorus oxychloride.

4. A process for the preparation of a water-insoluble organic derivative of cellulose containing phosphorus which comprises esterifying a partially hydrolyzed organic compound of cellulose in a bath containing phosphorus oxychloride and a tertiary organic base.

CARL J. MALM.
CHARLES E. WARING.